April 17, 1951  D. W. MOORE, JR  2,549,623
PNEUMATIC TEMPERATURE-RESPONSIVE APPARATUS
Filed Aug. 19, 1947
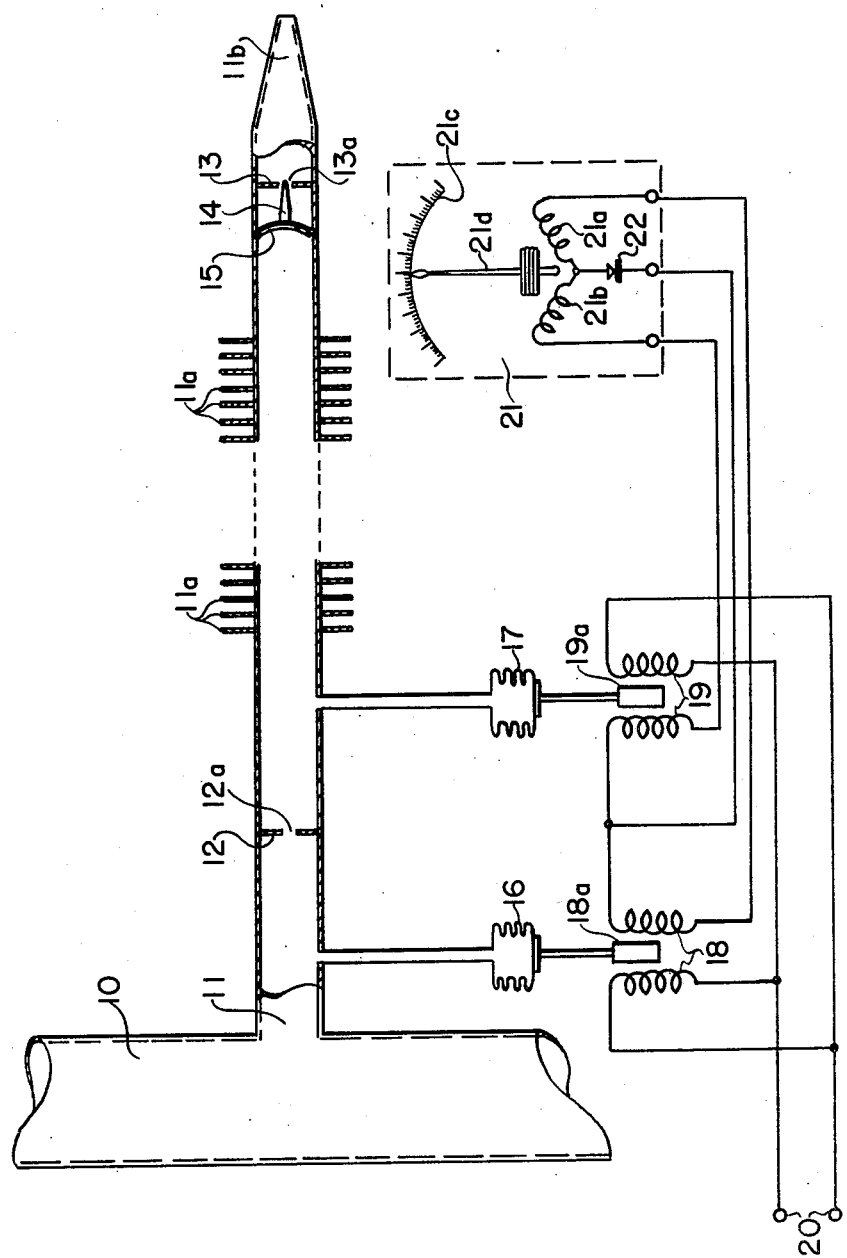
INVENTOR.
DAVID W. MOORE, Jr.
BY
Laurence B Dodds
ATTORNEY Patented Apr. 17, 1951

2,549,623

UNITED STATES PATENT OFFICE 2,549,623

PNEUMATIC TEMPERATURE-RESPONSIVE APPARATUS

David W. Moore, Jr., New York, N. Y., assignor to Fairchild Camera & Instrument Corporation, a corporation of Delaware Application August 19, 1947, Serial No. 769,510

11 Claims. (Cl. 73—357)

This invention relates to pneumatic temperature-responsive apparatus and, while it is of general application, is particularly adapted to the measurement of the temperature of an elastic fluid at a temperature so high that ordinary temperature-measuring apparatus is inapplicable as, for example, to the measurement of the temperature of the combustion gases in an internal combustion gas turbine.

In applicant's copending application Serial No. 604,867, filed July 13, 1945, entitled "Elastic-Fluid Temperature-Responsive System," assigned to the same assignee as the present application, there is described and claimed a pneumatic temperature-responsive apparatus utilizing the basic principles of Boyle's law in combination with Gay-Lussac's law or Charles' law, namely, that for any given mass of perfect gas the following equation is satisfied under all conditions of temperature and pressure:

$$PV = RT \quad (1)$$

where $P$ = absolute pressure of the gas
$V$ = volume of the gas
$T$ = temperature of the gas
$R$ = the gas constant.

In the system of that application, if a quantity of high-temperature elastic fluid is extracted from its container, cooled, and its mass flow measured, regulated, or otherwise determined, it is shown that the volumetric flow of the hot gas through a metering orifice, as determined by the differential pressure across such orifice, is representative of a temperature factor of the hot fluid and, if the static high pressure is maintained constant, is representative of the actual temperature of the fluid on a properly calibrated scale.

The present invention represents a modification of the pneumatic temperature-responsive system of the aforesaid copending application which is advantageous in certain applications. This simplification depends upon utilization of the principle that the mass flow of an elastic fluid through a constriction, such as an orifice or a venturi, varies only with respect to temperature and the absolute pressure level of the system, if the differential pressure across the orifice is maintained above its critical value. The general principles controlling the flow of gases through an orifice at pressures above critical may be found in the textbook "Elementary Engineering Thermodynamics" by G. A. and B. W. Young, McGraw-Hill, 1941, pages 142 et seq. Such critical pressure is determined by a number of parameters, including the composition of the gas and the type or shape of constriction.

For combustion gases of a gas turbine running on aviation gasoline involving combustion temperatures in the range of 500° to 2500° F. and with an orifice of the orifice plate type, the critical pressure is of the order of two to one, expressed as a ratio of the high-side orifice pressure to the low-side pressure. All pressures higher than such a critical value will, therefore, result in a mass flow through the metering orifice dependent only on variations in the temperature and the absolute pressure level of the system.

If then the elastic fluid is passed through two such constrictions in series and the ratio of the fluid temperature at the downstream constriction to the area of such constriction is maintained constant, it can be shown that the temperature of the elastic fluid is represented by the ratio of the absolute pressures on the opposite sides of the upstream constriction. The area of the downstream constriction is generally constant and the elastic fluid through the system may be converted to a constant temperature by appropriate cooling provisions interposed between the constrictions. If it is impracticable to cool the fluid to an approximately constant temperature, the downstream constriction may be compensated for temperature variations. In the absence of such compensation there is a second-order of temperature error varying as $\sqrt{T}$.

It is an object of the invention, therefore, to provide a new and improved pneumatic temperature-responsive apparatus of the type described and claimed in aforesaid copending application in which the apparatus is simplified.

It is another object of the invention to provide a new and improved pneumatic temperature-responsive apparatus of the type described in which the means for determining the desired temperature factor of the extracted elastic fluid utilizes the principle that the mass flow of an elastic fluid through a constriction, across which is maintained a pressure greater than the critical pressure, is dependent only on the temperature of the fluid and the absolute pressure level of the system.

As used herein and in the appended claims, the term "critical pressure" is defined as the differential pressure across a constriction of such value that the mass flow through the constriction is dependent only upon the temperature of the fluid at the constriction and its absolute pressure, The term "high pressure" as used herein and in the appended claims is defined as a pressure in excess of critical pressure.

In accordance with the invention, a pneumatic apparatus responsive to a temperature factor of an elastic-fluid source comprises a conduit in fluid connection with the source, a constriction in the conduit in the vicinity of said source, and a constriction in said conduit spaced from said source. The conduit includes provisions for cooling the fluid in its passage between the constrictions and the constrictions are so proportioned that the differential fluid pressures thereacross are maintained above the critical value. The apparatus also includes means responsive to the ratio of the absolute pressures on opposite sides of the constriction in the vicinity of the source for developing an effect representative of the desired temperature factor.

For a better understanding of the present invention, together with other and further objects thereof, reference is had to the following description taken in connection with the accompanying drawing, and its scope will be pointed out in the appended claims.

Referring now to the single figure of the drawing, there is illustrated, partially schematically, a pneumatic temperature-responsive apparatus embodying the invention for measuring the temperature of a high-temperature elastic-fluid source.

Referring now more specifically to the drawing, there is represented a pneumatic apparatus responsive to a temperature factor, specifically the temperature, of a high- temperature elastic-fluid source in a container 10, which may be a portion of the gas chamber of an internal combustion gas turbine. This apparatus includes a conduit 11 in fluid connection with the source in the container 10 to conduct a flow of elastic fluid from the container. Disposed in the conduit 11 in the vicinity of the container 10 is an orifice plate 12 having a central constriction or orifice 12a through which the elastic fluid from the container 10 flows. Also included in the conduit 11 spaced from the orifice plate 12 is a second orifice plate 13 having a central constriction or orifice 13a.

The conduit 11 includes provisions for cooling the elastic fluid in its passage between the constrictions 12a and 13a. If the length of the conduit 11 between these two constrictions is sufficient, the conduit alone may act as cooling means for reducing the temperature of the fluid at the constriction 13a to a substantially constant temperature approximating ambient. However, if the cooling effect of the conduit 11 alone is insufficient for this purpose, conventional cooling means, such as cooling fins 11a, may be added.

The temperature-responsive apparatus of the invention further includes means for maintaining substantially constant the ratio of the fluid temperature at the constriction 13a to the square of the area thereof. If the cooling means described is adequate to maintain the temperature at the constriction 13a constant, this cooling means alone is sufficient as, in such event, the area of the constriction 13a will also remain constant. However, if the temperature of the fluid at the orifice 13a varies to any substantial degree, there may be provided means responsive to the fluid temperature at the constriction 13a for adjusting the area thereof to maintain constant such ratio. For example, there may be provided, as illustrated, an adjustable plug 14 for constriction 13a and a thermostatic element, such as a bi-metallic strip 15 disposed in the conduit 11 adjacent the constriction 13a, for adjusting the plug 14 to maintain such ratio substantially constant.

As stated above, the constrictions 12a and 13a are so proportioned relative to the mean static pressure of the fluid source in the container 10 and the outlet pressure of the conduit 11, which may be determined by any suitable constriction such as a nozzle 11b, that the differential fluid pressure across each of the constrictions is maintained above the critical value.

The pneumatic temperature-responsive apparatus of the invention further includes means responsive to the ratio of the absolute pressures on opposite sides of the first constriction 12a for developing an effect, which effect is representative of the desired temperature factor. If the temperature at the downstream constriction 13a is maintained substantially constant, this temperature factor becomes the actual temperature of the high-temperature fluid source in the container 10. This last-described means may comprise a pair of absolute pressure devices, such as the pressure capsules 16 and 17, connected to the high-pressure side and low-pressure side, respectively, of the constriction 12a for developing effects, specifically displacements, varying with the static pressures on the respective sides of the constriction 12a.

The pressure ratio-responsive means further includes means responsive to the ratio of the effects or displacements developed by the capsules 16 and 17 for developing the desired effect representative of the desired temperature factor. This latter means may be in the form of a pair of electrical pick-off units individually actuated by the capsules 16 and 17, each effective to develop an alternating-current electrical signal varying with the respective absolute pressure. The pick-off units may comprise variable-ratio transformers 18 and 19 having adjustable magnetic core elements 18a and 19a, respectively, actuated by the pressure capsules 16 and 17. The primary windings of the transformers 18 and 19 may be energized from any suitable alternating-current supply terminals 20. The ratio-responsive means further includes a polarized electrical ratio meter 21 having a pair of windings 21a and 21b individually connected to the secondary windings of the variable-ratio pick-off transformers 18 and 19, respectively, through suitable rectifying means. As illustrated, the circuits of the windings 21a and 21b have a common conductor in which is included rectifying means, such as a crystal rectifier 22, so that the windings 21a and 21b are individually energized by the rectified signals developed by the pick-off devices 18 and 19, respectively. The meter 21 is provided with a scale 21c and co-operating indicator or pointer 21d.

The operation of the pneumatic temperature-responsive apparatus described may best be understood by considering certain fundamental relationships. As developed in the above-mentioned textbook of Young et al., the mass flow of an elastic fluid through an orifice across which the differential pressure is maintained above its critical value is expressed by the relation:

$$M = C \frac{AP}{\sqrt{T}} \qquad (2)$$

where

M = fluid mass flow through the orifice
A = area of the orifice
P = high-side static pressure at the orifice T = high-side fluid temperature at the orifice
C = a constant including the orifice constant and the gas constant R.

Applying the above equation to the orifices 12a and 13a and using subscript "1" to refer to orifice 12a and subscript "2" to refer to orifice 13a, Equation 2 can be written:

$$T_1 = \left(\frac{P_1}{P_2}\right)^2 \times \frac{T_2}{(A_2)^2} \times A_1^2 \qquad (3)$$

Since the area $A_1$ of the orifice 12a is normally constant, assuming negligible thermal expansion and contraction, if the ratio $T_2/A_2^2$ is maintained constant, then Equation 3 becomes:

$$T_1 = K\left(\frac{P_1}{P_2}\right)^2 \qquad (4)$$

The ratio $T_2/A_2^2$ can be maintained constant by suitable proportioning of the configuration or taper of the plug 14 in relation to the characteristic of the bi-metallic strip 15.

As indicated above, the static pressures $P_1$ and $P_2$ at the opposite sides of the orifice 12a are impressed upon the pressure capsules 16 and 17, which are effective to adjust the cores 18a and 19a of the variable-ratio transformers 18 and 19, respectively. The transformers 18 and 19 are proportioned and designed so that the alternating-current signals developed in their secondary windings vary approximately linearly with the static pressures impressed upon the pressure capsules 16 and 17. These signals are rectified by the rectifier 22 and energize the windings 21a and 21b, respectively, of the ratio-type polarized electrical meter 21. By proper calibration of the scale 21c, the pointer 21d of the meter may be made to indicate directly the temperature of the high-temperature fluid source in the container 10.

As pointed out above, if the cooling provisions associated with the conduit 11 are sufficient to reduce the temperature at the orifice 13a to a substantially constant value, the compensating plug 14 and bi-metallic strip 15 may be omitted. In such case, any error due to variations in temperature will be a second order effect varying with the square root of the absolute temperature at the orifice 13a.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressures thereacross are maintained above the critical value, and means responsive to the ratio of the absolute pressures on opposite sides of said first constriction for developing an effect representative of the desired temperature factor.

2. A pneumatic apparatus responsive to the temperature of an elastic-fluid source comprising: a conduit in fluid connection with said source; a first constriction in said conduit in the vicinity of said source; a second constriction in said conduit spaced from said source; provisions for maintaining substantially constant the ratio of the fluid temperature at said second constriction to the square of the area thereof; said constrictions being so proportioned that the differential fluid pressures thereacross are maintained above the critical value, and means responsive to the ratio of the absolute pressures on opposite sides of said first constriction for developing an effect representative of the desired temperature.

3. A pneumatic apparatus responsive to the temperature of an elastic-fluid source comprising: a conduit in fluid connection with said source; a first constriction in said conduit in the vicinity of said source, a second constriction in said conduit spaced from said source; means responsive to the fluid temperature at said second constriction for adjusting the area thereof to maintain substantially constant the ratio of such temperature to the square of such area; said constrictions being so proportioned that the differential fluid pressures thereacross are maintained above the critical value, and means responsive to the ratio of the absolute pressures on opposite sides of said first constriction for developing an effect representative of the desired temperature.

4. A pneumatic apparatus responsive to the temperature of an elastic-fluid source comprising: a conduit in fluid connection with said source; a first constriction in said conduit in the vicinity of said source, a second constriction in said conduit spaced from said source, said conduit including provisions for cooling said fluid in its passage between said constrictions; an adjustable plug for said second constriction, a thermostatic element disposed in said conduit adjacent said second constriction for adjusting said plug to maintain substantially constant the ratio of the temperature thereat to the square of the area of said second constriction; said constrictions being so proportioned that the differential fluid pressures thereacross are maintained above the critical value, and means responsive to the ratio of the absolute pressures on opposite sides of said first constriction for developing an effect representative of the desired temperature.

5. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressures thereacross are maintained above the critical value, a pair of absolute-pressure devices connected to opposite sides of said first constriction for developing effects varying with the pressures thereat; and means responsive to the ratio of said effects for developing an effect representative of the desired temperature factor.

6. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressures thereacross are maintained above the critical value, a pair of absolute-pressure devices connected to opposite sides of said first constriction for developing electrical signals varying with the pressures thereat; and means responsive to the ratio of said signals for developing an effect representative of the desired temperature.

7. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressures thereacross are maintained above the critical value, a pair of absolute-pressure devices connected to opposite sides of said first constriction; a pair of electrical pick-off units individually actuated by said devices, each effective to develop an electrical signal varying with the respective absolute pressure; and an electrical ratio meter having a pair of windings connected to be individually energized by said signals for giving an indication of the desired temperature factor.

8. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressures thereacross are maintained above the critical value, a pair of absolute-pressure devices connected to opposite sides of said first constriction; a pair of electrical pick-off units individually actuated by said devices, each effective to develop an alternating-current electrical signal varying with the respective absolute pressure; rectifying means; and a polarized electrical ratio meter having a pair of windings individually connected to said pick-off units through said rectifying means for giving an indication of the desired temperature factor.

9. A pneumatic apparatus responsive to a temperature factor of an elastic-fluid source comprising: a conduit in fluid connection with said source; a first constriction in said conduit in the vicinity of said source; a second constriction in said conduit spaced from said source; said conduit including provisions for cooling said fluid in its passage between said constrictions; said constrictions being so proportioned that the differential fluid pressure across at least one of said constrictions is maintained above the critical value, and means responsive to the pressures on opposite sides of one of said constrictions for developing an effect representative of the desired temperature factor.

10. A pneumatic apparatus responsive to the temperature of an elastic-fluid source comprising: a conduit in fluid connection with said source; a first constriction in said conduit in the vicinity of said source; a second constriction in said conduit spaced from said source; provisions for maintaining substantially constant the ratio of the fluid temperature at said second constriction to the square of the area thereof; said constrictions being so proportioned that the differential fluid pressure across at least one of said constrictions is maintained above the critical value, and means responsive to the pressures on opposite sides of one of said constrictions for developing an effect representative of the desired temperature.

11. A pneumatic apparatus responsive to the temperature of an elastic-fluid source comprising: a conduit in fluid connection with said source; a first constriction in said conduit in the vicinity of said source; a second constriction in said conduit spaced from said source; means responsive to the fluid temperature at said second constriction for adjusting the area thereof to maintain substantially constant the ratio of such temperature to the square of such area; said constrictions being so proportioned that the differential fluid pressure across said second constriction is maintained above the critical value, and means responsive to the pressures on opposite sides of said first constriction for developing an effect representative of the desired temperature.

DAVID W. MOORE, Jr.

REFERENCES CITED

The following references are of record in the file of this patent:

UNITED STATES PATENTS

| Number | Name | Date |
|---|---|---|
| 773,684 | Speller | Nov. 1, 1904 |
| 1,630,307 | Norwood et al. | May 31, 1927 |
| 1,630,318 | Tate | May 31, 1927 |
| 1,719,067 | Martin | July 2, 1929 |
| 2,103,741 | Bencowitz | Dec. 28, 1937 |
| 2,354,130 | Langer et al. | July 18, 1944 |
| 2,411,712 | De Giers | Nov. 26, 1946 |